Patented Aug. 2, 1949

2,478,093

UNITED STATES PATENT OFFICE 2,478,093

ANIMAL HYPNOTIC COMPOSITION

Arthur George Fishburn and James Allan Hendry, Manchester, and John Francis, Wilmslow, England, assignors to Imperial Chemical Industries Limited, a corporation of Great Britain No Drawing. Application October 9, 1946, Serial No. 702,098. In Great Britain October 13, 1945

4 Claims. (Cl. 167—52)

This invention relates to veterinary medicinal preparations and more particularly to compositions suitable for use as veterinary hypnotics and general anaesthetics.

According to the invention we provide compositions suitable for use as veterinary hypnotics and general anaesthetics which are aqueous dispersions whereof the dispersed phase comprises 2-($\beta$-naphthoxy)-ethanol in the form of small particles of which the greatest linear dimension does not exceed 150 microns.

We have found, surprisingly, that such dispersions of 2-($\beta$-naphthoxy)-ethanol are eminently suitable for administration by intravenous injection as short-acting veterinary hypnotics and general anaesthetics. They are inexpensive and have a number of valuable features not possessed by any single agent in general use. Thus, with the new compositions only negligible excitement has been observed during the induction of anaesthesia. It is therefore unnecessary to cast large animals; the drug may be given with the animal standing and it then sinks to the ground. Moreover in contrast to other veterinary hypnotics and general anaesthetics, such as chloral hydrate, the new compositions are non-irritant if accidentally introduced subcutaneously. They produce good relaxation of the abdominal muscles without markedly depressing respiration or circulation and even when a large dose is given over an extended period the animal recovers rapidly. A suitable dose for producing light to fairly deep anaesthesia in horses, cattle and sheep is of the order of 0.04 to 0.07 gm. of $\beta$-naphthoxyethanol per kg. of body weight. Numerous minor surgical procedures which do not occupy more than about 10 minutes can then be performed before the animal begins to recover. If on the other hand a longer period of anaesthesia is required, repeated doses may be given as may be necessary. We have in this way maintained anaesthesia quite successfully for an hour both in a sheep and in a young bovine. Alternatively, if it is preferred, chloroform may be used for maintaining the anaesthesia induced by injection of the new composition. When repeated injections are used to maintain anaesthesia over an extended period, it is preferable that sodium citrate (1%) or other anti-coagulant should be incorporated in the dispersion so as to prevent blood from clotting in the hypodermic needle.

Although 2-($\beta$-naphthoxy)-ethanol has been used successively in anaesthetising a wide variety of animals, tests in the field have shown that its use should be preferably restricted to horses because with other animals, such as sheep and cows, the margin of safety is small.

As they are to be administered by intravenous injection, the new compositions are preferably substantially neutral. Dispersions having a pH in the range 6 to 8 can readily be made and are preferred.

The simplest form of such compositions is a suspension of finely powdered 2-($\beta$-naphthoxy)-ethanol in water. Such suspensions are quite satisfactory hypnotic agents but they are rather viscous and not very stable and can only be satisfactorily administered in small quantities at a time since the naphthoxyethanol tends to stick to the inside of the hypodermic syringe. Preferred embodiments of the invention are therefore preparations which contain a dispersing agent to counteract this tendency and to increase their stability and make them more suitable for storage. The dispersing agents must be such that in the proportions used they are not toxic or otherwise deleterious to animals but with that qualification they may be anionic, cationic or non-ionic in nature. Examples of suitable dispersing agents are sodium dinaphthylmethane disulphonate (see Example 1 of British specification No. 7,137/13), sodium cetyl sulphate, a polyglyceryl recinoleate made as described in Example 2 of German specification No. 575,911, a condensation product of iso-octyl phenol with 7.5 molecular proportions of ethylene oxide (see British specification No. 470,181), cetyl trimethylammonium bromide and dodecyl pyridinium bromide.

The optimum quantity of dispersing agent varies somewhat with its nature and also with the concentration of the dispersion to be made. It is advantageous to make fairly concentrated dispersions since the amount of liquid to be injected is thereby minimised, but regard must also be had to the stability of the dispersion and likewise to its viscosity. An unduly concentrated dispersion may become too viscous for facile administration. In practice it is found that dispersions containing 5% to 25% w./v. of $\beta$-napthoxyethanol are the most suitable, and for such dispersions the appropriate concentration of dispersing agent usually lies in the range 0.01% to 5%. The expression w./v. is sometimes referred to as gms./100 cc.

The dispersions may also if desired contain electrolytes or other deflocculating agents, for example sodium chloride, magnesium sulphate or aluminium sulphate, whereby an enhanced stability may be obtained.

2-(β-naphthoxy)-ethanol is a white crystalline solid of M. P. 76° C. which is virtually insoluble in water. It may be made by reaction of β-naphthol with ethylene oxide or ethylene chlorhydrin—see Journal of the Chemical Society, 1914, vol. 105, p. 2135, and Journal of the American Chemical Society, 1920, vol. 42, p. 164, and 1929, vol. 51, p. 3416.

The β-naphthoxyethanol may be obtained in the degree of subdivision necessary by ball or gravel milling or by grinding with an indifferent solid. Owing to the low melting point of the β-naphoxyethanol cooling of the mill may be desirable.

The following examples illustrate, but are not to be taken as in any way limiting the invention. Unless otherwise expressed, the parts are by weight and the relationship between parts by weight and parts by volume is that subsisting between the kilogram and the litre.

Example 1

A dispersion is made by triturating 10 parts of 2-(β-naphthoxy)-ethanol ground to a particle size of 30 microns in a solution of 0.15 part of a condensation product of p-iso-octyl-phenol with 7.5 molecular proportions of ethylene oxide (made by the method of British specification No. 470,181) in 41 parts of water. The volume of the dispersion is 50 parts so that the concentrations of 2-(β-naphthoxy)-ethanol and dispersing agent are, respectively, 20% and 0.3% w./v. The dispersion is fluid and non-caking. It settles to a slight extent upon storage but is quite readily redispersed by shaking.

Example 2

A dispersion is made by the method described in Example 1 but using 0.1 part of dodecyl pyridinium bromide as the dispersing agent. The dispersion is similar to that of Example 1 but settles rather more readily: it is, however, readily redispersed by shaking.

Example 3

A dispersion is made by the method of Example 1 but using 0.01 part of sodium cetyl sulphate as the dispersing agent. The dispersion is similar to that of Example 1.

We claim:

1. An animal hypnotic composition in aqueous dispersion comprising from 5 to 25% of 2-(β-naphthoxy)-ethanol in the form of small particles whose greatest linear dimension does not exceed 150 microns and .01 to 5% by weight of a dispersing agent.

2. An animal hypnotic composition according to claim 1 where the dispersing agent is the condensation product of p-iso-octyl-phenol and ethylene oxide.

3. An animal hypnotic composition according to claim 1 where the dispersing agent is sodium cetyl sulfate.

4. An animal hypnotic composition in aqueous dispersion comprising 2-(β-naphthoxy)-ethanol in the form of small particles whose greatest linear dimension does not exceed 150 microns and 0.01 to 5% by weight of a dispersing agent comprising sodium dinaphthylmethane disulphonate.

ARTHUR GEORGE FISHBURN.
JAMES ALLAN HENDRY.
JOHN FRANCIS.

REFERENCES CITED

The following references are of record in the file of this patent:

UNITED STATES PATENTS

| Number | Name | Date |
|---|---|---|
| 2,322,759 | Lontz | June 29, 1943 |

OTHER REFERENCES

Journal of the Chemical Society, vol. 105, page 2135 (1914). (Copy in S. L.)

Journal of the American Chemical Society, vol. 42, page 164 (1920). (Copy in S. L.)

Journal of the American Chemical Society, vol. 51, page 3416 (1929). (Copy in S. L.)

Griffith, American Journal of Pharmacy, Jan. 1937, pages 18 to 23. (Copy in S. L.)